(12) United States Patent
de Roulet

(10) Patent No.: US 8,837,720 B2
(45) Date of Patent: Sep. 16, 2014

(54) CRYPTOGRAPHICALLY SECURE PSEUDORANDOM NUMBER GENERATOR

(76) Inventor: Paul de Roulet, Greenbrae, CA (US)

( * ) Notice: Subject to any disclaimer, the term of this patent is extended or adjusted under 35 U.S.C. 154(b) by 293 days.

(21) Appl. No.: 13/423,053

(22) Filed: Mar. 16, 2012

(65) Prior Publication Data

US 2013/0243192 A1    Sep. 19, 2013

(51) Int. Cl.
*G06F 21/00* (2013.01)
(52) U.S. Cl.
USPC .............................................................. 380/46
(58) Field of Classification Search
CPC ................................................... G06F 7/58
USPC .......................................................... 380/46
See application file for complete search history.

(56) References Cited

U.S. PATENT DOCUMENTS

| | | | |
|---|---|---|---|
| 5,454,039 A | 9/1995 | Coppersmith et al. | |
| 6,275,586 B1 * | 8/2001 | Kelly | 380/46 |
| 6,421,780 B2 * | 7/2002 | Tichenor | 726/1 |
| 6,865,660 B2 * | 3/2005 | Duncan | 711/217 |
| 8,019,802 B2 | 9/2011 | Rose et al. | |
| 8,036,377 B1 | 10/2011 | Poo et al. | |
| 2005/0207207 A1 | 9/2005 | Gammel et al. | |
| 2009/0271462 A1 | 10/2009 | Schneider | |

* cited by examiner

*Primary Examiner* — Jason Gee
(74) *Attorney, Agent, or Firm* — Steven A. Nielsen; Allman & Nielsen, P.C.

(57) ABSTRACT

A hardware- and software-efficient class of cryptanalytically-safe pseudorandom number generators is disclosed. Embodiments of the class can be implemented with only a modest use of program space and as few as 512 bytes of non-volatile data space, such embodiments suitable to a wide range of computer architectures, ranging from resource-constrained microcontrollers to high-end, multi-core processors.

20 Claims, 6 Drawing Sheets

CRYPTOGRAPHICALLY SECURE PSEUDORANDOM NUMBER GENERATOR

BACKGROUND OF THE INVENTION (1) Field of the Invention

The invention generally relates to the generation of encryption keys and other components useful in computer system security. More particularly, the invention relates to means and methods of efficiently creating cryptographically secure encryption keys and pseudorandom numbers.

(2) Description of the Related Art

U.S. Pat. No. 5,454,039 issued to Coppersmith et al on Sep. 26, 1995 discloses various means and methods of producing pseudorandom function families.

U.S. Pat. No. 8,036,377 issued to Poo et al on Oct. 11, 2011 discloses the use of various arrays, tweaker functions, encryption units and other means and methods to encrypt and decrypt data blocks.

U.S. Patent Application 2009/0271462 by Schneider published on Oct. 29, 2009 discloses a pseudo-random number generation system using a secret key combined with machine state information to input in to a hash function.

U.S. Patent Application 2005/0207207 by Gammel et al published on Sep. 22, 2005 discloses a random number generator combining the states of various memory cells for input into a feedback processor.

U.S. Pat. No. 8,019,802 issued to Rose et al on Sep. 13, 2011 discloses a pseudorandom number generator that requires multiple seed sources to feed a calling application.

While the prior art does provide means of random number generation, there is a need in the art for more efficient means of random number generation with a higher quality of randomness and increased security.

BRIEF SUMMARY OF THE INVENTION

The present invention overcomes shortfalls in the related art by presenting an unobvious and unique combination, configuration of data shifting, seeding, cycling and other methodologies to produce random numbers with significant advantages over the prior art.

Embodiments of the present invention overcome shortfalls in the prior art by:

1. Enabling vector (binary seed) initializations of unlimited lengths.
2. Providing an efficient method of creating a basic Pseudorandom Number Generator (PRNG).
3. Providing an efficient method of creating a Cryptographically Secure Pseudorandom Number Generator (CSPRNG) with an average period not typically exhibited in the known prior art.
4. Providing an efficient method of creating a cryptographically secure Pseudorandom Function Family (PRF).

Embodiments of the present invention overcome shortfalls in the prior art by exhibiting a cryptographically-strong Key Scheduling Algorithm (KSA) with no known weak keys. Even with a seed comprised of all 0 or 1 bits, unexpectedly good results are achieved, contrary to the teachings of the prior art. Embodiments of the present invention do not exhibit statistical anomalies associated with the pseudorandom, permutation-based systems of the prior art, with such prior art examples including RC4, ARC4, ISAAC and others.

Embodiments of the invention produce pseudorandom numbers in the range 0 to $2^{n-1}$, with n being the number of bits in an arbitrary machine word size.

Embodiments of the disclosed systems comport with microprocessor architectures having the following capabilities:

1. Retrieval and storage of arbitrary members of an array of integer values.
2. Addition of unsigned integer values.
3. Left and right bit shifting of unsigned integer values.
4. Masking selected bits of integer values using a bitwise AND operation.

Unexpected results or proof of superiority over the prior art was found by testing the output of embodiments of the disclosed invention. Such outputs were tested using TestU01, from A C Library for Empirical Testing of Random Number Generators, ACM Trans. Math. Softw., Vo. 33, No 4, 2007, page 22, by L'Ecuyer, P. L., and Simard, R., Diehard Statistical Tests, by Marsaglia G. and A Statistical Test Suite for Random and Pseudorandom Number Generators for Cryptographic Applications, by Nist Special Publication 800-22, Revision 1a, U.S. Government Printing Office, April 2010.

Embodiments of the invention disclosed herein have achieved unexpected results in producing pseudorandom numbers, encryption keys and other data sets of higher quality than of those known in the prior art. Embodiments of the invention have a multitude of uses which will become apparent to those skilled in the art after reading this disclosure.

REFERENCE NUMERALS IN THE DRAWINGS

Figure 1:
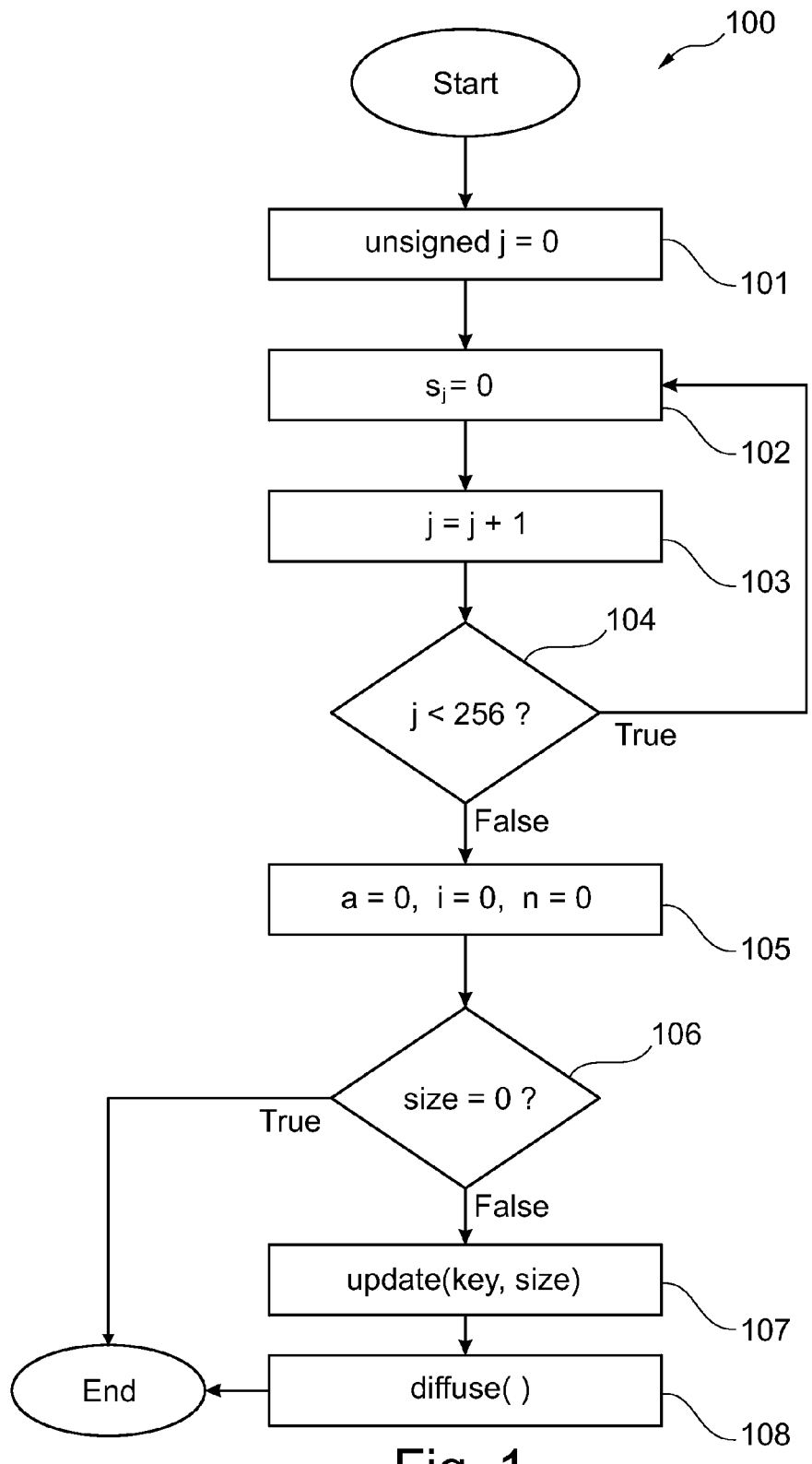
FIG. 1 is a schematic of an initialization system

100 initialization function
101 unsigned j=0, initialization of j, as a subscript of an array s sometimes called state array s, resulting in an array with zeros
102 $s_j=0$, set the element indexed by j to zero
103 j=j+1, j being the index to the next element of state array s to be addressed or initialized.
104 a decision component, to ensure that there is no overrun past the defined limit of the array, if j is less than 256 or some other predefined value, control is sent back to block 102. If j is equal to or greater than 256 or some other predefined value, control is passed to block 105.
105 three variables a, i and n are set to zero, a is the accumulator, i is the current index into the state array s, and n is the cumulative length (in bytes) of the key (seed)
106 a decision component, if the variable size is equal to zero, go to the end of the function and return to the calling routine; otherwise call the update function, using key and size as parameters.
108 a call to the diffuse function
200 a system for diffusing the information entropy in the key (seed)
201 unsigned j=0; j being a counter variable
202 a call to a cycle function 420
203 a call to the cycle function 420 using n as an input value, n being the size of the key in bytes
204 n=n>>8, an unsigned shift, shifting the value of n eight bits to the right
205 j=j+1, j being a counting variable

206 a decision component wherein if j<4, cycle(n) is called at 203, if j is greater than or equal to four or some other predetermined number, control is passed to the cycle function at 207

207 the cycle function 420 is called one last time

300 $s_0$ with s being a state array and $s_0$ the first element of the array

301 $s_{255}$ being the last element of the array

302 $p_0$ p being the array of consecutive prime numbers, with $p_0$ being the first element of the array

303 $p_{255}$ the last element of the prime array p

304 $s_i$ the array s or the state array, with the value of i being used to show an index value.

305 $j=s_i$

306 $s_j$ the element in the s array referenced by subscript j

307 $k=s_j$, with k being a temporary variable

308 $p_k$ being the element of the prime array p referenced by subscript k

309 is the component wherein $a=a+p_k$; $m=k+(a>>3)$ and $x=m+(a>>1)$

310 $s_j=m$ with m being the result of the computation of 309

350 a pseudorandom number generator

400 $s_0$ the first element of the state array s

401 $s_{255}$ the last element of the state array s

402 $p_0$ the first element of the array of primes p

403 $p_{255}$ the last element of the array of primes p

405 $j=s_i+c$, with c being a constant parameter passed to the cycle function

406 $s_i$ the element of the state array s referenced by subscript i

408 $p_j$ the element in the p array or prime array referenced by subscript j

409 a component wherein $a=a+p_j$; $k=j+(a>>3)$

410 $s_i=k$ with k being the result of the computation of 409

420 a cycle function

600 an update function

601 the last element of the state array s

602 the first element of the key array 680

603 the last element of the key array, containing the last byte of the key, namely, $key_{size-1}$

605 a component wherein j is set to $s_i$ plus $key_k$

606 $s_i$ is the element of the state array s referenced by subscript i

609 a component wherein a is set to a plus $p_j$ and $s_i$ is set to j plus (a>>3); i.e., the value of a shifted right by three bits

610 the first element of the prime array p

611 the last element of the prime array p

620 the transition or path of the value held at $s_i$ to the component 605 wherein a new value is assigned to j

621 the transition or path of the value held at $key_k$ to the component 605 wherein a new value is assigned to j

622 the transition or path wherein the new value of j is obtained within component 605 and j is then used as an index value for obtaining the value of the prime number found at $p_j$ as shown at 650

623 the transition or path wherein the prime number found at $p_j$ is referenced in assignments performed in component 609

624 the transition or path wherein a new value obtained at component 609 is transferred into the contents of element $s_i$

625 $s_0$ the first element of the state array s

650 $p_j$ the element of prime array p referenced by subscript j

670 an array or series of prime numbers or in some embodiments may also be an array of non-prime numbers

680 an array of bytes describing a key (or seed)

800 $s_0$ with s being a state array and $s_0$ the first element of the array

801 $s_{255}$ being the last element of the state array s

802 $t_0$ t being the array of pseudorandom numbers with $t_0$ being the first element of the array

803 $t_{255}$ the last element of the array t

804 $s_i$ the array s or the state array, with the value of i being used to show an index value

805 $j=s_i$

806 $s_j$ the element in the state array s referenced by subscript j

807 $k=s_j$, with k being a temporary variable

808 $t_k$ being the element of the array t referenced by subscript k

809 is the component wherein $a=a+(t_{k\ \&\ 0xff})$ and $m=k+a$

810 $s_j=m$ with m being the result of the computation of 809

850 an alternative embodiment of a pseudorandom number generator

These and other aspects of the present invention will become apparent upon reading the following detailed description in conjunction with the associated drawings.

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

All the above references and U.S. patents and applications are incorporated herein by reference. Aspects of the invention can be modified, if necessary, to employ the systems, functions and concepts of the various patents and applications described above to provide yet further embodiments of the invention.

Referring to FIG. 1, an initialization system 100 is shown. A temporary variable, an unsigned integer shown as j, in block 101 is set to zero, or j=0. The variable j is used to index the state array s.

In block 102 $s_j$ is set to zero or $s_j$=0. s is the state array.

In block 103, the variable j is incremented by one, shown as j=j+1. In block 104, a decision component is shown wherein if j is less than 256 or some other selected number, control is sent back to block 102. If j is not less than 256 or some other selected number, control is forwarded to block 105. At block 105 variables a, i and n are set to zero and control is passed to block 106.

Block 106 may comprise a decision component. In some embodiments block 106 is omitted and control is passed directly to block 107. If block 106 is used a true value sends control to the end of the initialization function. A false value at block 106 sends control to block 107.

Block 107 is a call to the update function. Control is then sent to block 108 wherein a call is made to the diffuse function.

The initialization system 100 may also be described as:

[i]nitialize(key, size) or the initialization function is given a variable called key and another variable called size. The value of key represents an array of random eight bit numbers used to give an initial set of values to the state array s, the value of size is the number of eight bit values supplied in the key array.

Step 1. Set each element of array s to zero.
Step 2. a=0, or set the value of variable a to zero.
Step 3. i=0, or set the value of variable i to zero.
Step 4. n=0, or set the value of variable n to zero.
Step 5. If size<1, then proceed to step 8, if not advance to step 6.
Step 6. Call update(key, size) or use the update( ) function 600, passing the values for parameters key and size.
Step 7. Call diffuse( ) or use the diffuse function 200.
Step 8. Return to the calling routine or to a main function.

Figure 2:
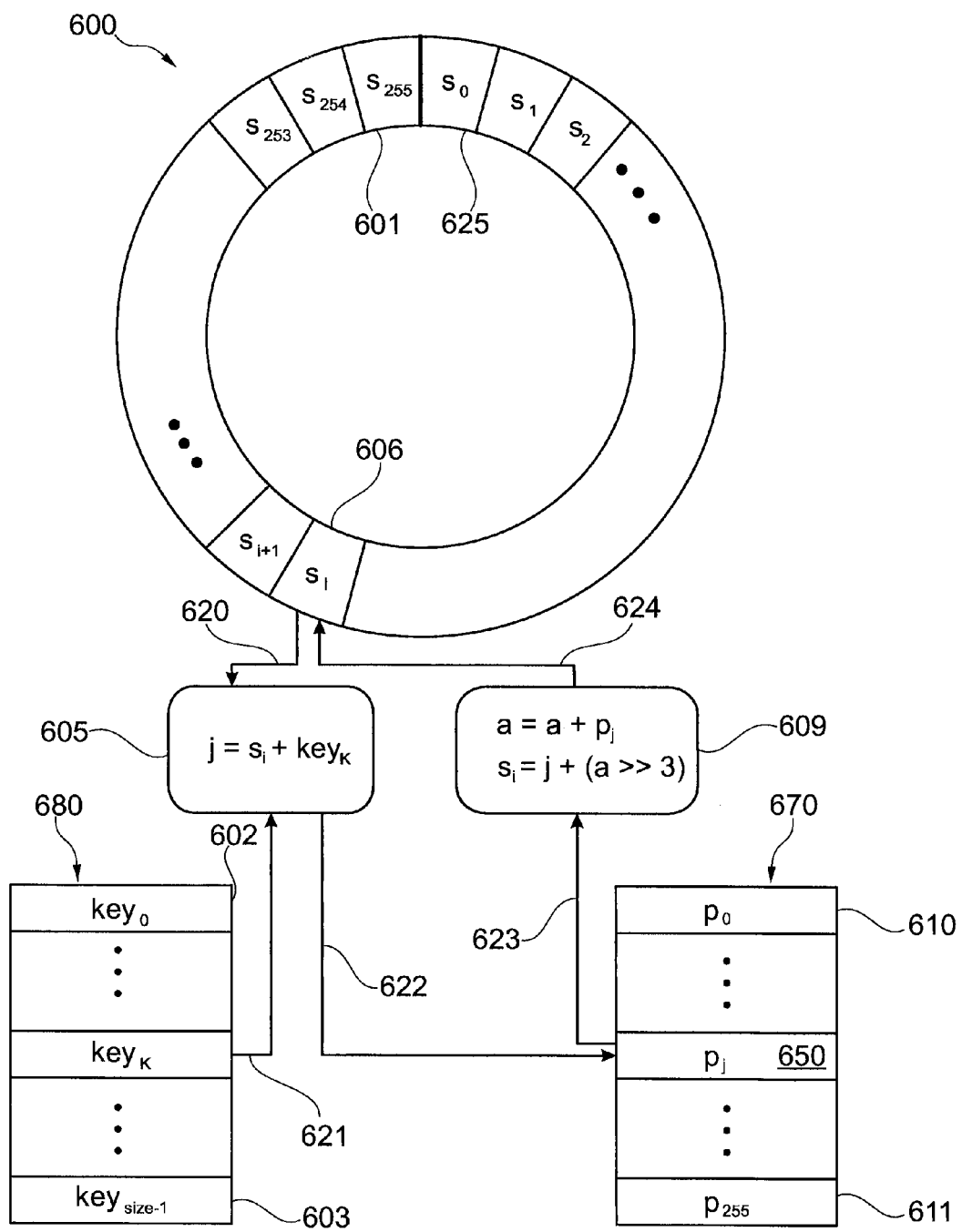
FIG. 2 is a schematic of an update system

Referring to FIG. 2, an update function 600 is described wherein a random key (seed) is added to the state array s, and in this process of adding, bits are mixed as well and further dispersed as further described below. In other words, the update function mixes the information entropy of the key into the state array s.

The update function is fed a key parameter, the key parameter being an array of unsigned eight bit bytes. The update function accepts a second parameter known as size with size being an unsigned integer. The size integer specifies the number of bytes in the key. The key buffer comprises an array of unsigned eight bit integers, the number of elements in the array is set to the integer specified by size.

[s]ize being the length of the key in bytes and size is also the number of elements or memory slots in the key array.

The update function, starting at block 605, the value of j, a temporary unsigned integer variable, is set by adding the contents of $s_i$ and the contents of $key_k$. Then, the value of j is used as an index to retrieve the value found at $p_j$, then at block 609 the value extracted at $p_j$ is added to the accumulator a, shown as a=a+$p_j$, then the value of $s_i$ is set to j plus the value of a shifted by three bits to the right, this is equivalent to dividing by eight and ignoring the remainder.

Then the new value of $s_i$ is used to overwrite the previous value of $s_i$ within the s array. The process repeats with index i and index k each being incremented by one. This cycle stops when k is equal to or greater than size.

Figure 3:
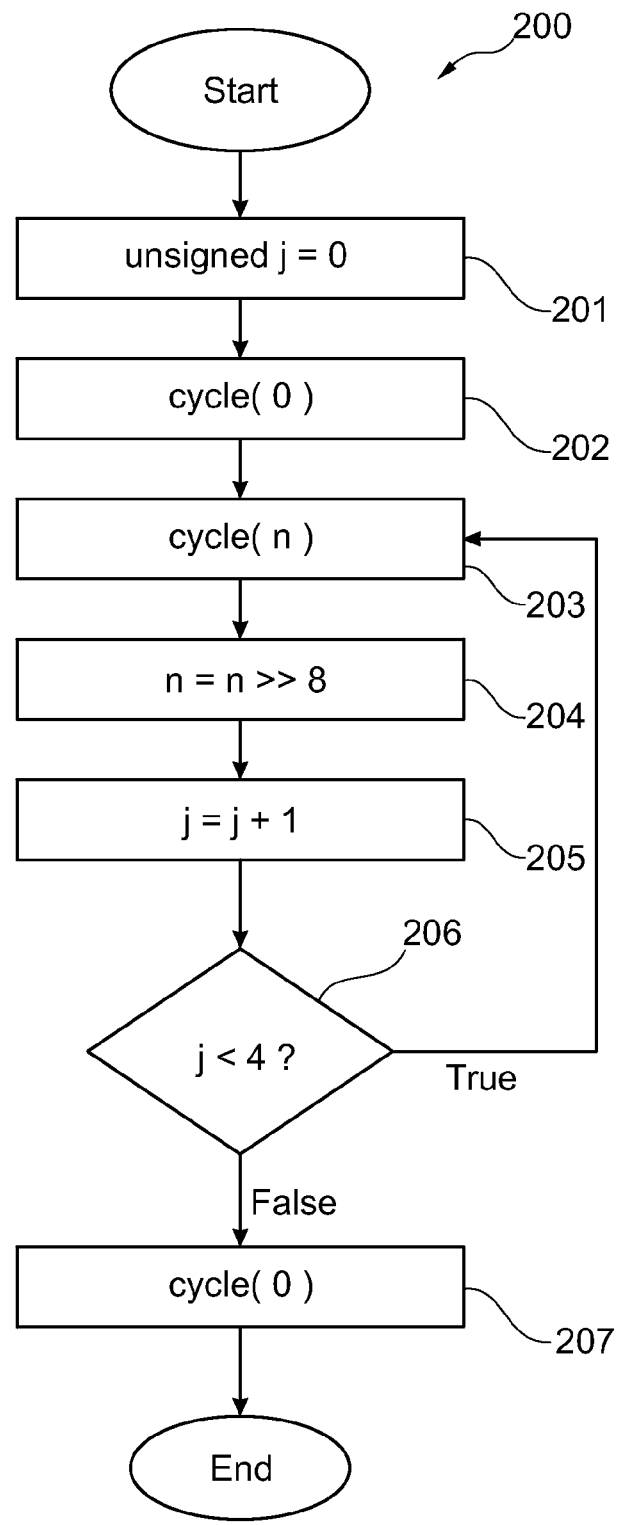
FIG. 3 is a schematic of a data diffusion system

Referring to FIG. 3 a diffuse( ) function 200 is illustrated wherein block 201 sets a temporary unsigned variable j to zero or j=0, with variable j being a counting variable and used later in block 205. Control is then passed to block 202 wherein the cycle( ) function 420 is called, shown as cycle(0), wherein the cycle( ) function is started with a value of zero.

Control is passed to block 203 wherein the cycle function is called again, but with an input of n, shown as cycle(n). Control is passed to block 204, wherein n is shifted right by eight bits, shown as n=n>>8. Control is then passed to block 205 wherein variable j is incremented by a value of one, shown as j=j+1.

Control is passed to block 206 wherein a decision component passes control to block 203 for a true value or to block 207 for a false value. For purposes of illustration, a value of four is used, shown in block 206 as "j<4?".

Block 207 is a call to the cycle function with an input of zero, shown as cycle(0).

Figure 4:
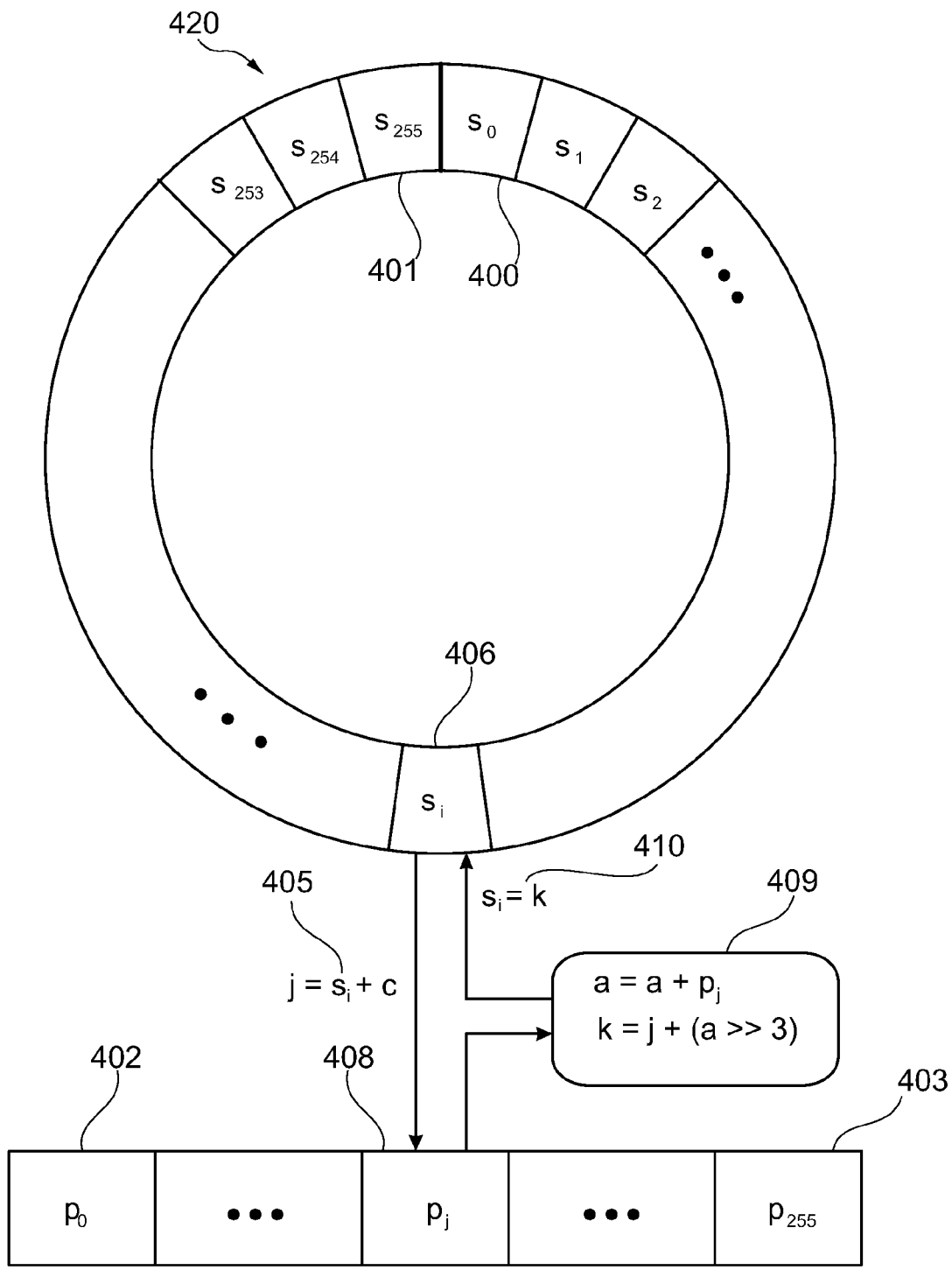
FIG. 4 is a schematic of a cycle system

Referring to FIG. 4, the cycle system is shown. The cycle( ) function accepts an unsigned eight bit integer, specified by function parameter c. The value of j is set by the contents of $s_i$ plus c, c representing the value passed into the function as described above.

Then the contents of $p_j$ are accessed and then at block 409 the contents of $p_j$ are added to the accumulator a. Then k is assigned a value of j plus the value of a, the value of a being shifted right by three bits, which is equivalent to dividing by eight and ignoring the remainder. The element $s_i$ is then overwritten with the value of k. The process repeats 256 times, or the size of the state array s.

Figure 5:
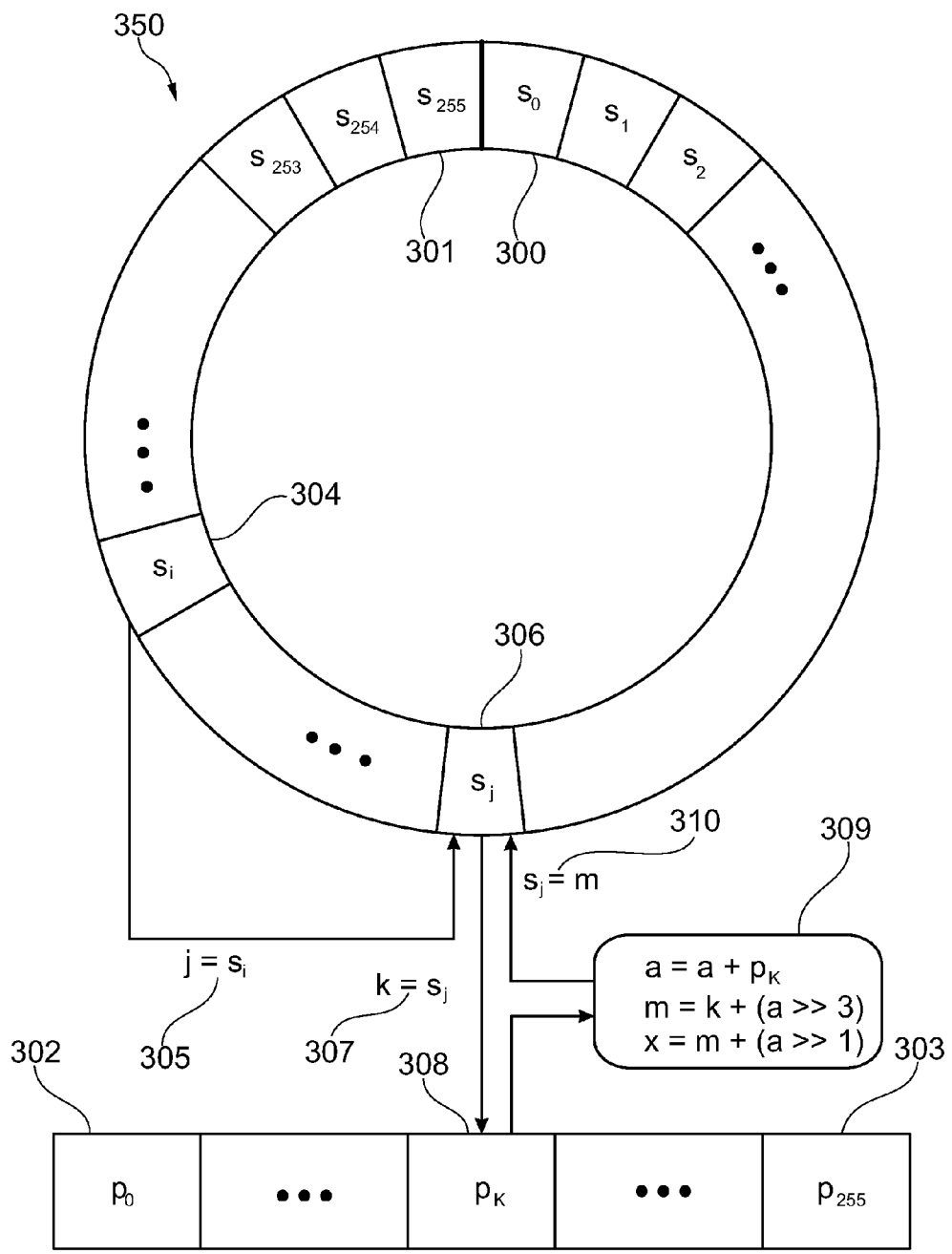
FIG. 5 is a schematic of a pseudorandom number generator

Referring to FIG. 5 a random number generator 350 is described. The generator comprises a state array s showing various states and supporting a changing of states. The value stored at the area labeled as $s_i$ is extracted and that value is assigned the temporary unsigned integer variable j, then the value stored at $s_j$ is extracted and assigned to the temporary unsigned integer variable k, then the value found at $p_k$ is extracted, and $p_k$ is added to the accumulator sometimes referred to as variable a.

Then, the temporary unsigned integer variable m is assigned the sum of k plus the value a, with a shifted three bit positions to the right; this treatment of a is equivalent to dividing a by eight and ignoring the remainder. Optionally, at this point, an output of a pseudorandom, unsigned eight bit byte may be obtained by assigning x, a value to be output, as x being equal to m plus a, with a being shifted one bit position to the right, which is equivalent to dividing a by two and ignoring the remainder. The value then assigned to x represents the pseudorandom number to be output. In other words, x is considered to be the next byte of the pseudorandom number stream output by the generate( ) function.

Then the element $s_j$ is overwritten with the value of m.

The process is then repeated until the desired count of pseudorandom numbers is obtained, the value in memory cell i being incremented after each iteration.

Figure 6:
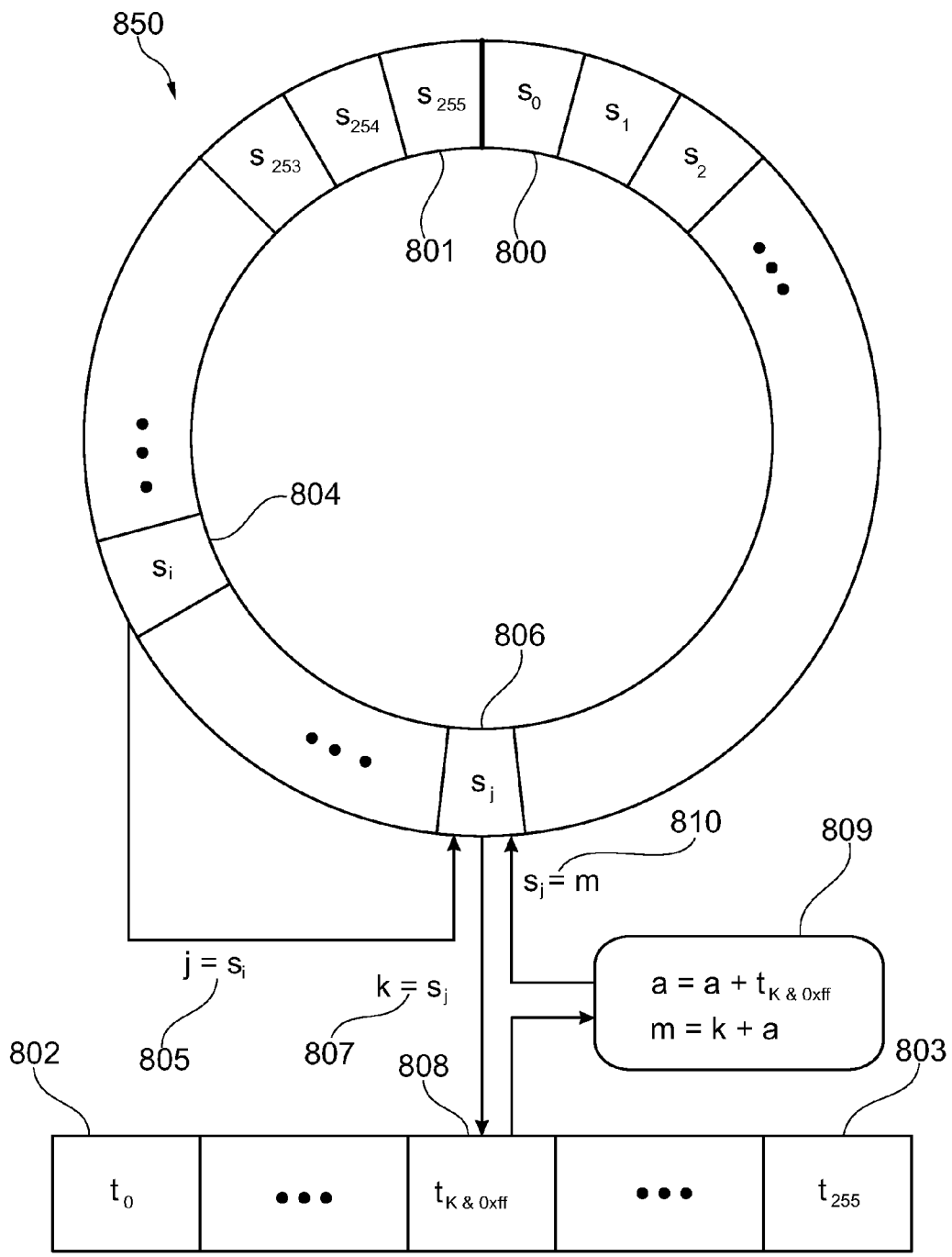
FIG. 6 is a schematic of an alternative pseudorandom number generator

Referring to FIG. 6, an alternative embodiment of a random number generator 850 is described. The generator comprises a state array s showing various states and supporting a changing of states. The value stored at the area labeled as $s_i$ is extracted and that value is assigned the temporary unsigned integer variable j, then the value stored at $s_j$ is extracted and assigned to the temporary unsigned integer variable k. The low eight bits are extracted from variable k, with such low bits used as the index value used to extract the value at $t_{k\ \&\ 0xff}$, the value found at $t_{k\ \&\ 0xff}$ being added to the accumulator sometimes referred to as variable a.

Then, the temporary unsigned integer variable m is assigned the sum of k plus the value a. Optionally, at this point, an output of a pseudorandom unsigned value may be obtained by extracting the value of m. In other words, m is considered to be the next value of the pseudorandom number stream output by the generate( ) function.

Then the element indexed at $s_j$ is overwritten with the value of m.

The process is then repeated until the desired count of pseudorandom numbers is obtained. The system of FIG. 6 may also be considered a generate function.

The system of FIG. 6 may also be implemented by use of the following computer-implemented method:

```
// For example, 64 bits
#define CSPRNG_TYPE UINT64
void csprng :: generate(
    CSPRNG_TYPE *buffer,
    unsigned size
) {
    UINT8 j;
    CSPRNG_TYPE k, m;
    while (size-- > 0) {
        j = s[i++];
        k = s[j];
        a += t[(UINT8)k];
        m = a + k;
        s[j] = m;
        *buffer++ = m;
    }
}
```

Embodiments of methods and machines for random number generation include the following items;

Item 1. A method of operating a computer implemented pseudorandom number generator 850, the method comprising the steps of:

a) establishing a state register s having a fixed number of memory cells, such as $s_0$ to $s_{255}$ arranged in a series, with each memory cell having a fixed word length;

b) establishing a number register t comprising a fixed number of memory cells such as $t_0$ to $t_{255}$ arranged in a series, with each memory cell having a fixed word length;

c) establishing an accumulator cell a;

d) establishing an index state register cell j;

e) establishing an index number register cell k;

f) establishing an output register cell m;

g) extracting a value held within the index state register cell j and using said value as an index value to the state register memory cells $s_j$ and then extracting the value held at the indexed state register memory cell $s_j$ and overwriting said value into the index state register cell j;

h) copying the value held within the state register s at the state register s cell number equal to the index state registry cell j and using said copied value to overwrite the value held by the index number register cell k;

i) using a predefined number of low bits of the value of the index number register cell k as an index value of the number register t and adding the number found at the index number register to add to the accumulator cell a;

j) adding the contents of the accumulator cell a and the value of index number cell k to the output register m; and k) overwriting the value indexed at $s_j$ with the value held at output register m.

Item 2. The method of item 1 further comprising the step of establishing a buffer to store the stream of values placed into the output register cell m.

Item 3. The method of item 1 further including the step of initially placing pseudorandom numbers within the state register s, the number register t, the accumulator cell a, the index state register cell j, the index number register cell k, the output register cell m and the buffer.

Item 4. The method of item 1 further including the steps of using the same number of memory cells in series in establishing the state register s and number register t.

Item 5. The method of item 1 further including the step of prepopulating the contents of the number register t with prime numbers.

Item 6. The method of item 1 further including the steps of using the same number of memory cells in series in establishing the state array s and number array t.

Item 7. The method of item 1 further including the step of using equal computer memory cell sizes when establishing the size in bits of the elements of the state array s and the number array t.

Item 8. The method of item 1 replacing number array t with an array of prime numbers known as prime array p.

Item 9. The method of item 8 wherein the sum of the prime numbers used in prime array p is twice the product of two or more odd primes.

Item 10. The method of item 9 wherein the sum of the prime numbers used in prime array p is two times an odd prime number.

Item 11. The method of item 8 wherein a portion of bits within the accumulator memory cell a are used when calculating the value to be assigned to output memory cell m.

Item 12. A method of operating a computer implemented pseudorandom number generator, the method comprising the steps of:

a) establishing a state array s having a fixed number of memory cells, such as $s_0$ to $s_{255}$ arranged in a series, with each memory cell having a fixed word length;

b) establishing a number array t comprising a fixed number of memory cells such as $t_0$ to $t_{255}$ arranged in a series, with each memory cell having a fixed word length;

c) establishing an accumulator memory cell a;

d) establishing a memory cell i to be used as an index, with i being an unsigned eight bit integer;

e) establishing a memory cell j to be used as an index with j being an unsigned eight bit integer;

f) establishing a memory cell k;

g) extracting a value held within the state array s, using the value held at memory cell i as an index to the state array s, said element known as $s_i$, using said value $s_i$ to overwrite the contents of memory cell j;

h) extracting a value held within the number array t, using the value held at memory cell j as an index to the number array t, said element known as $t_j$, i) adding the value extracted at $t_j$ to the accumulator memory cell a;

j) setting the contents of memory cell k to the sum of memory cell j and the value of the accumulator memory cell a with the memory cell a shifted right by three bits, which is equivalent to dividing by eight and ignoring the remainder;

k) overwriting the value held at state array element $s_i$ with the value held at memory cell k.

Item 13. The method of item 12 further comprising the step of incrementing the value held within memory cell i before repeating the steps of item 12.

Item 14. The method of item 12 further comprising the step of initially placing pseudorandom numbers within the state array s and the number array t.

Item 15. The method of item 12 further comprising the step of initially placing prime numbers within the state array s and the number array t.

Item 16. The method of item 16 used to prepopulate the state array s and number array t used in item 1.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

The disclosed embodiments are not limited by any particular word length, variable sizes, parameter sizes, array sizes or other sizes. The sizes of components described herein are for illustration purposes only, but, such described sizes have been found to fully enable the embodiments described herein.

While certain aspects of the invention are presented below in certain claim forms, the inventor(s) contemplate the various aspects of the invention in any number of claim forms.

Appendix A is attached hereto and is a source code listing implementing various aspects of the invention described herein.

What is claimed is:

1. A method of operating a computer implemented pseudorandom number generator, the method comprising the steps of:
   a) establishing a state array s having a fixed number of memory cells, such as $s_0$ to $s_{255}$ arranged in a series, with each memory cell having a fixed word length;
   b) establishing a number array t comprising a fixed number of memory cells such as $t_0$ to $t_{255}$ arranged in a series, with each memory cell having a fixed word length;
   c) establishing an accumulator memory cell a;
   d) establishing a memory cell i to be used as an index, with i being an unsigned eight bit integer;
   e) establishing a memory cell j to be used as an index with j being an unsigned eight bit integer;
   f) establishing a memory cell k;
   g) establishing an output memory cell m;
   h) extracting a value held within the state array s, using the value held at memory cell i as an index to the state array s, said element known as $s_i$, using said value $s_i$ to overwrite the contents of memory cell j;
   i) extracting a value held within the state array s, using the value held at memory cell j as an index to the state array s, said element known as $s_j$, using said value $s_j$ to overwrite the contents of memory cell k;
   j) extracting a value held within the number array t, using the lowest eight bits of the value held at memory cell k as an index to the number array t, said element known as $t_k$, adding said extracted value at $t_k$ to the accumulator memory cell a;
   k) setting the contents of memory cell m to the sum derived by adding the contents of the accumulator memory cell a and the contents of memory cell k ;
   l) overwriting the value held at state array element $s_j$ with the value held at memory cell m, m being a pseudorandom number generated; and
   encrypting data with the pseudorandom number.

2. The method of claim 1 further comprising the step of establishing a buffer to store a stream of values each of which is retrieved from the output memory cell m.

3. The method of claim 1 further comprising the step of incrementing the value held within memory cell i before repeating the steps of claim 1.

4. The method of claim 1 further comprising the step of initially placing pseudorandom numbers within the state array s and the number array t.

5. The method of claim 1 further comprising the step of initially placing a pseudorandom number in the accumulator memory cell a.

6. The method of claim 1 further including the steps of using the same number of memory cells in series in establishing the state array s and number array t.

7. The method of claim 1 further including the step of using equal computer memory cell sizes when establishing the size in bits of the elements of the state array s and the number array t.

8. The method of claim 1 replacing number array t with an array of prime numbers known as prime array p.

9. The method of claim 8 wherein the sum of the prime numbers used in prime array p is twice the product of two or more odd primes.

10. The method of claim 9 wherein the sum of the prime numbers used in prime array p is two times an odd prime number.

11. The method of claim 8 wherein a portion of bits within the accumulator memory cell a are used when calculating the value to be assigned to output memory cell m.

12. The method of claim 1 further comprising the step of complementing or incrementing the value held within memory cell t before repeating the steps of claim 1.

13. A method of operating a computer implemented pseudorandom number generator, the method comprising the steps of:
   a) establishing a state array s having a fixed number of memory cells, such as $s_0$ to $s_{255}$ arranged in a series, with each memory cell having a fixed word length;
   b) establishing a number array t comprising a fixed number of memory cells such as $t_0$ to $t_{255}$ arranged in a series, with each memory cell having a fixed word length;
   c) establishing an accumulator memory cell a;
   d) establishing a memory cell i to be used as an index, with i being an unsigned eight bit integer;
   e) establishing a memory cell j to be used as an index with j being an unsigned eight bit integer;
   f) establishing a memory cell k;
   g) extracting a value held within the state array s, using the value held at memory cell i as an index to the state array s, said element known as $s_i$, using said value $s_i$ to overwrite the contents of memory cell j;
   h) extracting a value held within the number array t, using the value held at memory cell j as an index to the number array t, said element known as $t_j$;
   i) adding the value extracted at $t_j$ to the accumulator memory cell a;
   j) setting the contents of memory cell k to the sum of memory cell j and the value of the accumulator memory cell a with the memory cell a shifted right by three bits, which is equivalent to dividing by eight and ignoring the remainder;
   k) overwriting the value held at state array element $s_i$ with the value held at memory cell k; and
   l) encrypting data using the value held within memory cell k.

14. The method of claim 13 further comprising the step of incrementing the value held within memory cell i before repeating the steps of claim 13.

15. The method of claim 13 further comprising the step of initially placing pseudorandom numbers within the state array s and the number array t.

16. The method of claim 13 further comprising the step of initially placing prime numbers within the state array s and the number array t.

17. The method of claim 13 used to prepopulate the state array s and number array t used in claim 1.

18. The method of claim 13 further comprising the step of adding an arbitrary eight-bit seed (key) value to the contents of memory cell j.

19. The method of claim 13 wherein all or a portion of bits within the accumulator memory cell a are used when calculating the value to be assigned to memory cell k.

20. The method of claim 13 further comprising the step of complementing or incrementing the value held within memory cell t before repeating the steps of claim 13.

* * * * *